United States Patent [19]

Choo

[11] Patent Number: 4,857,206

[45] Date of Patent: Aug. 15, 1989

[54] METHOD FOR TREATING, SPENT DRYFILM STRIPPING AND DEVELOPING SOLUTIONS

[75] Inventor: Tat Y. Choo, Dracut, Mass.

[73] Assignee: TMC Corp., Lowell, Mass.

[21] Appl. No.: 115,515

[22] Filed: Nov. 2, 1987

[51] Int. Cl.⁴ ............................................. C02F 1/52
[52] U.S. Cl. ................................... 210/709; 210/724; 210/738; 210/743
[58] Field of Search .............. 210/709, 724, 743, 96.1, 210/205, 206, 738

[56] References Cited

U.S. PATENT DOCUMENTS

| | | | |
|---|---|---|---|
| 3,835,045 | 9/1974 | Hussissian | 210/709 |
| 4,008,162 | 2/1977 | Korenowski et al. | 210/724 |
| 4,465,593 | 8/1984 | Wemhoff | 210/96.1 |
| 4,724,084 | 9/1988 | Pahmeier et al. | 210/709 |

OTHER PUBLICATIONS

Brochure from INLAND SPECIALTY CHEMICAL CO. on "Novatreat".
Brochure from J&S LABORATORIES on the treatment of spent strippers.
An article by Mr. Peter R. Rose in the magazine "PRINTED CIRCUIT FABRICATION", vol. 10, No. 5, May 1987, titled Dryfilm Resist Stripping, pp. 55 and 58.

Primary Examiner—Peter Hruskoci
Attorney, Agent, or Firm—Edwin Paul

[57] ABSTRACT

A method of treating spent dryfilm stripper and developer solutions by mixing the spent solutions with a solution of aluminum sulfate and borax in controlled amounts causing a reaction which results in a slurry of a non-sticky, benign precipitate in a supernatant liquid. The supernatant liquid contains the dissolved heavy metals. The non-sticky precipitate does not interfere with the ph measurement which indicates when the reaction is complete, and the benign precipitate can be fillered out for disposal.

2 Claims, 1 Drawing Sheet

METHOD FOR TREATING, SPENT DRYFILM STRIPPING AND DEVELOPING SOLUTIONS

BACKGROUND OF THE INVENTION

1. Field of the Invention

The present invention generally relates to treatment of spent, or used, dryfilm photoresist and solder mask stripping and developing solutions used in the printed circuitry industry.

2. Background of the Invention

Over the past thirty years the printed circuit industry has undergone substantial increases in the volume of printed circuit boards being made and also the volume of chemicals used in the fabrication of those boards. The treatment of the waste materials produced by this industry has not kept pace with the technical advances made in the production of those boards. These waste materials are dangerous and costly to treat and the need to improve the treatment of these waste materials is becoming more critical.

An article in the industry magazine *"Printed Circuit Fabrication"*, volume 10, No. 5, May, 1987 by Mr. Peter R. Rose entitled "Dryfilm Resist Stripping" starting on page 55 details techniques for using strippers. On page 58 at the bottom of column 2 and the top of column 3, the hazards of spent strippers are listed. These hazards include heavy metals, polymers, and the high alkaline content of these spent strippers. Mr. Rose, in the same section, mentions a proprietary process which aids by removing polymers by precipitation. This may be the process described in a brochure by Inland Specialty Chemical Co. of 3151 Airway Avenue, J-3, Costa Mesa, Calif. 92626 as "Novatreat".

"Novatreat" purports to prevent the forming of a sticky residue during the treating of spent strippers. However, as described in the last paragraph, the "Novatreat" is added "slowly and carefully to the cooled solution"; this infers that the hazards to the operators and the environment due to heat and fumes continues to exist.

Typical state of the art treatment of waste strippers is outlined in the brochure from J&S Laboratories Inc., 521 East "D" st., Wilmington, Calif. 90744. The treatment calls for the addition of 25% sulfuric acid solution to the spent stripper material, which is highly alkaline, in an open vessel. This process produces a precipitate and a violent reaction with heat and fumes which are dangerous to the operators and the local environment. pH is monitored to determine when this part of the process is complete, but this is not reliable since the precipitate is sticky and interferes with the pH measuring probe. The precipitate is removed by filtration, which is also adversely affected by the sticky precipitate, and the remaining fluid is fed to another treatment facility. However, the fluid, called supernatant, still contains dissolved stripper, lead, tin, copper and their compounds, since the treatment is not necessarily complete. This entire process takes more than two hours.

The supernatant is fed through chelated rinses, but the supernatant interferes with sludge formation, which does not easily settle and constantly clogs the system.

Consequently there is a need for a faster and more economical treatment, where the material is more completely treated, where the solid residue is benign, non-sticky and more easily removed by filtration, and where the residual supernatant is easily treated in typical chelated rinses without clogging. Additionally a need exists for a treatment where there is no violent reaction, with negligible heat and fumes, which will be safer for the operator and the environment.

SUMMARY OF THE INVENTION

The present invention provides a spent dryfilm resist stripper and developer solutions developer treatment apparatus and method which satisfies the aforementioned needs. The invention provides a means for mixing the spent dryfilm stripper and developer solutions with a chemical substance in controlled proportions. The mixing results in a reaction where a slurry is formed, containing a non-sticky precipitate in a liquid. This reaction occurs with negligible heat and fumes. This precipitate contains the polymers present in the spent dryfilm resist stripper and developer solutions, sodium sulfates, borax and aluminum hydroxide, all of which are benign.

The completeness of the reaction is measured by a pH probe in the preferred embodiment, and a means for controlling the proportions of the mixture in response to the pH probe ensures a complete reaction. The solid precipitate is separated by filtration, or other ordinary means, and the resulting supernatant fluid and precipitate are further processed by ordinary means.

In the preferred embodiment the treatment is carried out automatically in an enclosed chamber. The chemical substance in a powder form, is dissolved forming a solution in a holding tank. This solution is pumped simultaneously as the spent stripper is pumped, each to the same mixing chamber. In this chamber a reaction occurs producing a slurry with a non-sticky precipitate. The reaction produces significantly less heat and fumes because a chemical substance is used which reacts with the caustic soda and potash (sodium and potassium hydroxide) in the spent stripper to produce a reaction whose heat of formation is significantly less that the prior art use of sulfuric acid. The chemical substance may have a component which acts as a cleaning agent reducing surface energy of the stripper material and reducing the particle size of the precipitate. This component and the significantly reduced heat of the reaction produces a non-sticky precipitate.

The resulting slurry easily flows through the mixing chamber, then through a pH probe into a holding tank. The pH is constantly measured and the relative amounts of stripper and the chemical substance are controlled to produce a given pH. The pH is usually 7 to ensure the reaction was complete. The slurry is filtered into solid cakes and a supernatant liquid which are easily handled by ordinary methods.

This automatic process requires half the time of the standard process.

PREFERRED EMBODIMENT

Figure 1:
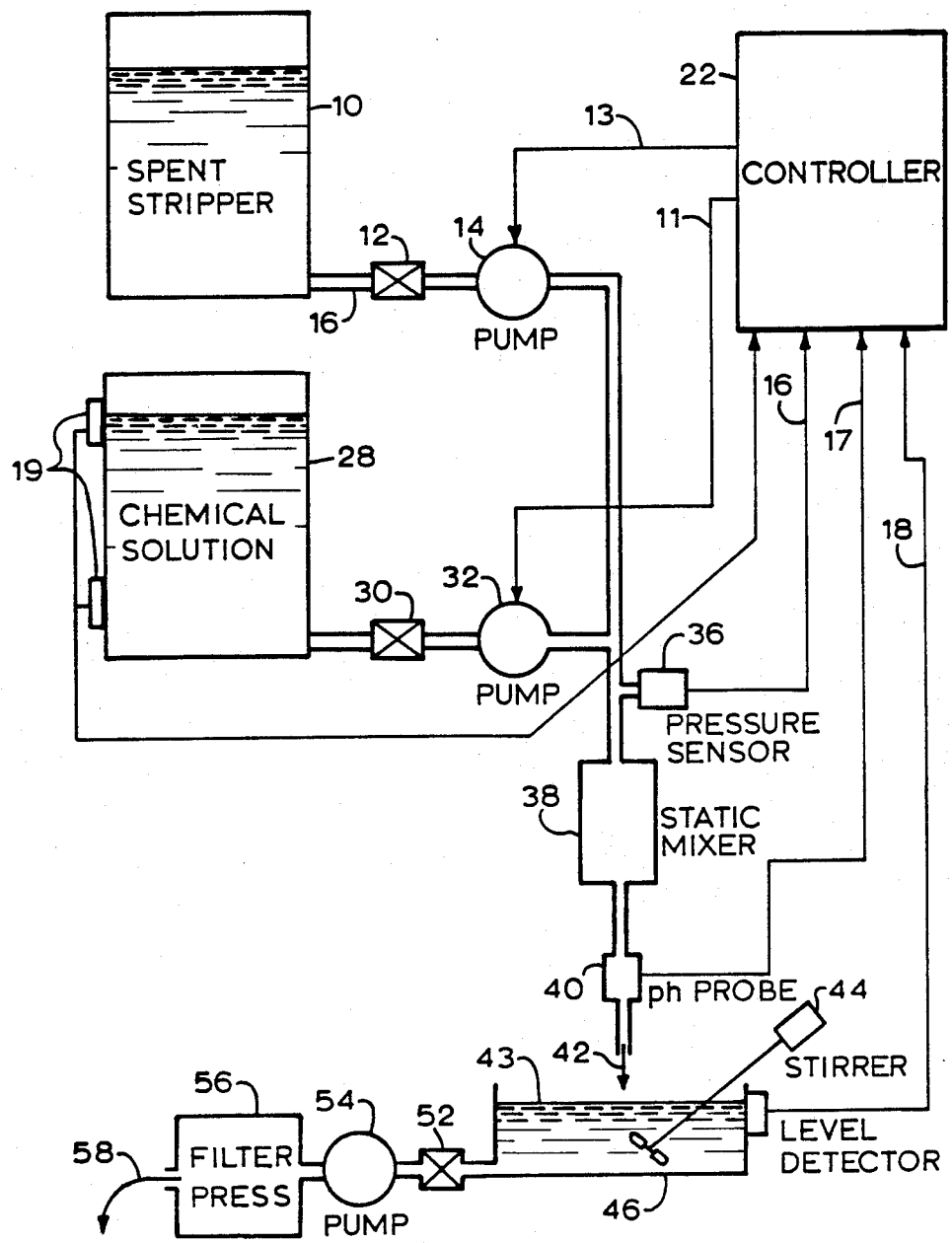
FIG. 1 is a schematic block diagram of the preferred embodiment.

Now referring to drawing, FIG. 1, the spent dryfilm stripper and developer solution, separately or in combination, is held in the tank 10 which has an outlet through tube 16 and valve 12 to a pump 14. The flow rate of the pump 14 is electrically controlled by the controller 22 through the connecting cable 13. The output of pump 14 is fed to the input of a static mixer 38. A chemical mixture dissolved in water is held in the tank 28. The chemical mixture is formed from aluminum sulfate ($Al_2(SO_4)_3$) and borax ($Na_2B_4O_7:10H_2O$), which are easily and safely handled by the operator of this equipment. The chemical solution is fed through valve 30 and pumped by pump 32 to the input of the static mixer 38. The pump 32 is controlled by the controller 22 through the connecting cable 11. The spent stripper and the chemical solution mix and cause a reaction. Since only a small controlled amount of material is fed by each pump and the heat of formation of the chemicals is significantly less, as compared to a sulfuric acid treatment, a negligible amount of heat is produced by the reaction. This reduced heat, the aluminum sulfate and the borax, together produce end products which are non-sticky. In this preferred embodiment the chemical mixture is 95% aluminum sulfate and 5% borax, however this ratio is representative and wide variations will work equally well. When dissolved, the solution can be of any concentration, as discussed below. Also at the inlet to the mixer 38 there is pressure sensor 36 which sends an electrical signal through cable 16 to the controller 22 which will shut down the system if an over pressure occurs.

The chemical mixture dissolved in water is 95% aluminum sulfate and 5% borax. Any concentration can be used since the feedback system, which ensures complete treatment of the spent stripper and developer, will automatically use the necessary amount independent of the concentration. Also the relative amounts of the aluminum sulfate and borax may have wide variations. The aluminum sulfate neutralizes the hydroxides in the strippers and developers with significantly less heat of formation, compared to the prior art. The borax acts as a cleaning agent reducing surface energy, particle size of the precipitate, and breaks up bubbles trapped within the precipitate. These facts produce a precipitate which is non-sticky. The relative amount of borax can have a wide range since it participates primarily in the ancillary parts of the reaction to produce a non sticky precipitate.

The reaction of the aluminum sulfate and the hydroxides in the strippers is: (Eq. 1) $2AL_2(SO_4)_3 + 6NaOH \rightarrow 3Na_2SO_4 + 2AL(OH)_3$, and for the potassium (Eq. 2) $2AL_2(SO_4)_3 + 6KOH \rightarrow 3K_2SO_4 + 2AL(OH)_3$, generated by these reactions can be calculated as the difference between the heat of formation of the reactants and the products of the reaction. From Lange's Handbook of Chemistry, 1942 edition, the heat generated by the reaction shown in Eq. 1 is 1278 kg-calories. In the prior art the reaction using sulfuric acid is: (Eq. 3) $3H_2SO_4 + 6NaOH \rightarrow 6Na_2SO_4 + 6H_2O$. The heat generated in this reaction is 2195.94 kg-calories. This calculates to a 42% decrease in the heat generated when using this invention. There is a similar decrease in heat generated comparing Eq. 2 to Eq. 3.

The higher heat generated by the prior art reaction produces a more violent reaction. When this reaction occurs in an open vessel exposed to the atmosphere, water vapor and volatile organic components of the stripper and developer are liberated as fumes. It follows that with less heat there will be less fumes. Small volumes of the stripper and developer are treated by the chemical mixture producing a small amount of heat energy which is easily carried away by the surrounding mechanical structure of the present invention, resulting in a small temperature rise and a thus a small production of fumes. Also the static mixer 38 is enclosed so there is no atmospheric contact, and any fumes generated are not easily released into the atmosphere.

The treated material passes through the pH probe 40, the material 42 exits into a slurry holding tank 46. A level probe 44 on the slurry holding tank 46 indicates when a convenient amount of processed material has been treated. The controller 22 will stop the pumping, open the valve 52 and pump the slurry with the diaphragm pump 54 to a filter press 56. The precipitate is removed in by the filter press 56 in the form of cakes. These cakes can be handled by ordinary methods, since the cakes contain resist polymer, aluminum hydroxide, borax and traces of sodium and potassium sulfate—which are safe products, unregulated by state or federal agencies. The remaining supernatant liquid 58 is also handled by ordinary commercial methods metal removal.

In this embodiment the pump 14 is run at a constant rate as determined by the operator. A given pH level is set by the adjustment 21. The controller in response to the reading from the pH probe, turns the pump 32 on or off. A higher pH reading than the set pH level would result in the pump 32 being turned on till the pH reading fell below the set pH level. This embodiment entails a cyclical pH which is higher then lower than the set level at regular intervals. However, the cumulative result in the holding tank 46 will be at the set pH level. In effect the holding tank 46 acts as a large smoothing mechanism of the pH. The stirrer 44 keeps a uniform slurry. Alternate embodiments include a more sophisticated controller which continuously varies the pumping rates of the two pumps 32 and 14 which will result in a more precise result but is more expensive.

What is claimed is:

1. A method of treating spent alkaline dryfilm resist stripper solutions or developer solutions or a mixture of both these solutions, used in the manufacture of printed circuit boards, leaving dissolved heavy metals in solution, which comprises the steps of:

first controllable pumping of said spent dryfilm resist stripper solutions and developer solutions containing dry film polymers and dissolved heavy metals;

second controllable pumping of a solution of aluminum sulfate and borax;

mixing the controllably pumped solutions in a mixing means, said mixing resulting in a chemical reaction of said solutions which forms a slurry of a non-sticky precipitate, composed of said dryfilm polymers, sodium and potassium sulfate, borax and aluminum hydroxide, in a supernatant liquid containing said dissolved heavy metals, and where said reaction produces negligible heat and fumes, and where sufficient aluminum sulfate and borax are mixed to neutralize the alkaline solutions and produce said non-sticky precipitate;

measuring the pH of said slurry with a pH meter to ensure completeness of said reaction;

controlling, responsive to said ph meter, said first and second pumping in proportion such that said reaction is complete;

receiving and accumulating said slurry, after said measuring means;

stirring said accumulated slurry to maintain a uniform consistency;

transferring said accumulated slurry to a filter press; and separating said precipitate from said supernatant liquid with said filter press.

2. A method as in claim 1 wherein said mixing means comprises an enclosed static mixer such that there is no atmospheric contact with said reaction.

* * * * *